United States Patent [19]
Yamanaka et al.

[11] 3,880,718
[45] Apr. 29, 1975

[54] METHOD FOR LIMITING DAMAGE DUE TO BACTERIOPHAGES IN FERMENTATION MEDIA

[75] Inventors: Shigeru Yamanaka, Yokohama; Nobukazu Kashima, Kawasaki; Koji Mitsugi, Yokohama, all of Japan

[73] Assignee: Ajinomoto Co., Inc., Tokyo, Japan

[22] Filed: Sept. 3, 1974

[21] Appl. No.: 503,047

[30] Foreign Application Priority Data
Sept. 4, 1973  Japan................................ 48-99635

[52] U.S. Cl.................................. 195/122; 195/47
[51] Int. Cl........................... C12b 1/24; C12d 13/06
[58] Field of Search ............ 195/100, 101, 102, 110, 195/103.5 R, 117, 121, 122, 29, 47

[56] References Cited
FOREIGN PATENTS OR APPLICATIONS
45-32234  10/1970  Japan.................................. 195/122

*Primary Examiner*—A. Louis Monacell
*Assistant Examiner*—C. A. Fan
*Attorney, Agent, or Firm*—Cooper, Dunham, Clark, Griffin & Moran

[57] ABSTRACT

Method for limiting damage resulting from the presence of bacteriophages in fermentation medium by effecting fermentation in the presence of at least one N-acylamino derivative of glutamic acid, glutamine or homocysteic acid or metallic salts thereof wherein the acyl group is characterized by containing an alkyl or alkenyl moiety having from about 16 to 18 carbon atoms.

8 Claims, No Drawings

METHOD FOR LIMITING DAMAGE DUE TO BACTERIOPHAGES IN FERMENTATION MEDIA

BACKGROUND OF THE INVENTION

The presence of bacteriophages in fermentation media designed to produce important products such as drugs, vitamins, amino acids and the like is a serious problem which has plagued the industrial production of these important materials by limiting the growth of desirable bacteria in growth cultures. Accordingly, much effort has been directed to the problem of controlling these bacterial viruses.

THE INVENTION

A method has now been discovered for limiting the damage resulting from the presence and growth of bacteriophages in fermentation media by effecting the fermentation in a medium containing an amount of at least one selected N-acylamino derivative of glutamic acid, glutamine or homocysteic acid which is effective to inhibit the production of the bacteriophage. The N-acylamino group is characterized as one which contains an alkyl or alkenyl moiety having from about 16 to 18 carbon atoms. Metallic salts of these compounds may also be employed, the preferred being alkali metal salts, especially sodium or potassium salts.

A particular advantage of the invention is that, while the selected agents inhibit propagation of the bacteriophages they have little or no effect on the growth of the bacteria or the production of the desired product of the fermentation.

The inhibiting agent can be added to the medium prior to the initiation of bacterial growth, or after such growth is already well underway. Normally, it is added in the initial stages of fermentation or at least before the growth of bacteria reaches the stationary phase. The amount of the selected compound or compounds employed is typically less than 50 $\mu$/ml, and there is rarely any advantage in exceeding this amount. It is generally preferred to use more than 2 $\mu$/ml of N-acylamino acid. It is not necessary to alter the usual methods of bacteia cultivation due to the presence of the inhibiting agent.

The advantage of this invention are applicable to fermentation processes including, for example, those designed for the production of antibiotics, enzymes, amino acids, nucleotides and nucleosides.

The following non-limiting examples are given by way of illustration only.

EXAMPLE 1

An aqueous culture medium was prepared to contain, per deciliter, 3.6 g glucose, 0.1 g $KH_2PO_4$, 0.1 g $MgSO_4 \cdot 7H_2O$, 2 mg $FeSO_4 \cdot 7H_2O$, 2 mg $MnSO_4 \cdot 4H_2O$, 24 mg (as nitrogen) soyprotien acid hydrolyzate, 100 $\mu$g thiamine-HCl, 0.3 $\mu$g biotin. N-acylamino acid shown in Table 1 (50 $\mu$g/ml) was also added to the medium.

Brevibacterium lactofermentum ATCC 13869 was inoculated into 30 ml of the aqueous medium placed in 500 ml flask, to a concentration of $2.74 \times 10^9$ cells/ml, and the medium was infected with phage $L_1$ (Journal of the Agricultural Chemical Society of Japan, Vol. 37, No. 11, 686–689 (1963) at a concentration of $1.16 \times 10^8$ P.F.U./ml.

Cultivation was carried out at 30°C for 24 hours with shaking. Glutamic acid accumulated in the cultivation broth is shown in Table 1.

Table 1

| N-acyl amino acid added | | Glutamic acid accumulated g/dl |
|---|---|---|
| N-acyl moiety | amino acid moiety | |
| Lauric acid | Glutamic acid | 0.31 |
| Myristic acid | " | 0.80 |
| Palmitic acid | " | 1.65 |
| Stearic acid | " | 1.60 |
| Oleic acid | " | 1.65 |
| Arachidic acid | " | 1.41 |
| Lauric acid | Glutamine | 0.22 |
| Myristic acid | " | 0.48 |
| Palmitic acid | " | 1.61 |
| Stearic acid | " | 1.60 |
| Oleic acid | " | 1.50 |
| Arachidic acid | " | 1.38 |
| Lauric acid | Homocysteic acid | 0.25 |
| Myristic acid | " | 0.90 |
| Palmitic acid | " | 1.68 |
| Stearic acid | " | 1.51 |
| Oleic acid | " | 1.25 |

As a comparison test, when the fermentation was carried out without adding either N-acyl amino acid or phages, 1.63 g/dl glutamic acid accumulated, while when the fermentation was carried out in the presence of infecting phages but without adding 50 $\mu$g/ml N-acyl amino acid, only 0.23 g/dl glutamic acid accumulated.

EXAMPLE 2

In the process of glutamic acid fermentation as described in Example 1, N-acylamino acid as shown in Table 2 was used (50 $\mu$g/ml), and cultivation was carried out by the same manner as in Example 1. Glutamic acid accumulated in the fermentation broth is shown in Table 2.

Table 2

| N-acyl amino acid added | | Glutamic acid accumulated g/dl |
|---|---|---|
| N-acyl moiety | amino acid moiety | |
| Palmitic acid | Homocysteic acid | 1.68 |
| Oleic acid | " | 1.51 |
| Palmitic acid | Glutamic acid | 1.65 |
| Oleic acid | " | 1.65 |
| Palmitic acid | Glutamine | 1.61 |
| Oleic acid | " | 1.50 |
| Palmitic acid | Aspartic acid | 0.25 |
| Oleic acid | " | 0.30 |
| Palmitic acid | Proline | 0.51 |
| Oleic acid | " | 0.60 |
| Palmitic acid | Phenylalanine | 0.50 |
| Oleic acid | " | 0.51 |
| Palmitic acid | Methionine | 0.29 |
| Oleic acid | " | 0.25 |
| Palmitic acid | Lysine | 0.28 |
| Oleic acid | " | 0.22 |
| Palmitic acid | Valine | 0.30 |
| Oleic acid | " | 0.35 |
| Palmitic acid | Leucine | 0.31 |
| Oleic acid | " | 0.38 |

EXAMPLE 3

N-acylamino acid as shown in Table 3 was added to the medium of Example 1 in the amount shown in Table 3. Cultivation of Brevibacterium lactofermentum ATCC 13869 was carried out by the same manner as in Example 1. The amounts of glutamic acid shown in Table 3 were accumulated.

Table 3

| Amount added | N-oleoyl glutamic acid | N-stearoyl glutamine | N-palmitoyl homocysteic acid |
|---|---|---|---|
| 0 (μg/ml) | 0.21 (g/dl) | 0.21 (g/dl) | 0.21 (g/dl) |
| 5 | 1.20 | 0.89 | 0.99 |
| 20 | 1.70 | 1.45 | 1.60 |
| 50 | 1.62 | 1.61 | 1.65 |
| 70 | 1.21 | 1.18 | 1.05 |
| 100 | 1.01 | 0.98 | 0.75 |
| 200 | 0.70 | 0.50 | 0.48 |

EXAMPLE 4

Brevibacterium lactofermentum ATCC 13869 was inoculated into the medium of Example 1 ($2 \times 10^7$ cells/ml) which was infected at an initial concentration of $2 \times 10^4$ phages/ml. N-acylamino acid mixtures containing 50 percent N-oleoyl glutamic acid and 50 percent N-palmitoyl glutamic acid were added in the amount of 20 μg/ml or 50 μg/ml at 0, 5, 8 or 12 hours cultivation time. After 12 hours cultivation in the same manner as in Example 1, the amounts of glutamic acid as shown in Table 4 were found in the culture broths.

Table 4

| | 0 Hours (g/dl) | 5 Hours (g/dl) | 8 Hours (g/dl) | 12 Hours (g/dl) |
|---|---|---|---|---|
| 20 μg/ml | 1.69 | 1.68 | 1.00 | 0.80 |
| 50 | 1.55 | 1.60 | 1.08 | 0.81 |

EXAMPLE 5

Brevibacterium lactofermentum ATCC 13869 was cultured in the presence of phage $L_1$ (phages number / cells number = $7.3 \times 10^{-2}$), or in the presence of phage $S_1$ (phages number / cells number = $4.2 \times 10^{-2}$). Phage $S_1$ is reported in Agricultural and Biological Chemistry, Japan vol. 31, No. 7, 861–867 (1967). The medium employed was the same as in Example 1, except for the amount of biotin (shown in Table 5). N-palmitoyl glutamic acid was added to the medium in the amount of 0, 2 or 50 μg/ml.

Growth of Brevibacterium lactofermentum ATCC 13869 was determined by measuring optical density of 26 times dilution at 562 mμ. Glutamic acid in the culture broth was also determined. The results with phage $L_1$ and with phage $S_1$ are shown in Tables 5 and 6, respectively.

Table 5

| Phage | Biotin (μg/l) | N-palmitoyl glutamic acid (μg/ml) | Growth | Glutamic acid accumulated (g/dl) |
|---|---|---|---|---|
| Not infected | 0 | 0 | 0.406 | 1.11 |
| | 1 | 0 | 0.770 | 1.63 |
| | 2 | 0 | 0.950 | 1.23 |
| | 3 | 0 | 0.975 | 0.64 |
| | 5 | 0 | 1.04 | 0.06 |
| | 10 | 0 | 1.24 | 0.04 |
| | 2 | 50 | 0.90 | 1.62 |
| | 3 | 50 | 0.95 | 0.81 |
| | 5 | 50 | 1.01 | 0.19 |
| | 10 | 50 | 1.10 | 0.06 |
| | 3 | 0 | 0.300 | 0.20 |
| | 5 | 0 | 0.364 | 0.16 |

Table 5-Continued

| Phage | Biotin (μg/l) | N-palmitoyl glutamic acid (μg/ml) | Growth | Glutamic acid accumulated (g/dl) |
|---|---|---|---|---|
| | 10 | 0 | 0.820 | 0.11 |
| Infected | 3 | 50 | 0.940 | 1.16 |
| | 5 | 50 | 0.920 | 1.65 |
| | 10 | 50 | 0.980 | 0.09 |

Table 6

| Phage | Biotin (μg/l) | N-palmitoyl glutamic acid (μg/ml) | Growth (× 1/26) | Glutamic acid accumulated (g/dl) |
|---|---|---|---|---|
| Not infected | 0 | 0 | 0.406 | 1.11 |
| | 1 | 0 | 0.770 | 1.63 |
| | 2 | 0 | 0.950 | 1.23 |
| | 3 | 0 | 0.975 | 0.64 |
| | 5 | 0 | 1.04 | 0.06 |
| | 10 | 0 | 1.24 | 0.04 |
| | 2 | 2 | 0.98 | 1.61 |
| | 3 | 2 | 1.06 | 0.65 |
| | 5 | 2 | 0.970 | 0.05 |
| | 10 | 2 | 1.04 | 0.01 |
| Infected | 3 | 0 | 0.560 | 0.38 |
| | 5 | 0 | 0.870 | 0.61 |
| | 10 | 0 | 1.17 | 0.30 |
| | 3 | 2 | 0.645 | 1.32 |
| | 5 | 2 | 0.900 | 1.05 |
| | 10 | 2 | 1.15 | 0.32 |

EXAMPLE 6

An aqueous culture medium was prepared to contain, per deciliter, 10 g glucose, 0.1 g $KH_2PO_4$, 0.04 g $MgSO_4 \cdot 7H_2O$, 0.2 mg ferrous ion, 0.2 mg manganese ion, 100 mg (as nitrogen) soy-protein acid-hydrolyzate, 4.5 g $(NH_4)_2SO_4$, 5 μg thiamine·HCl, and adjusted at pH 8.0. 20 Ml batches were placed in 500 ml flasks, and to each flask was added the amount of N-stearoyl glutamic acid shown in Table 7.

Brevibacterium lactofermentum FERM-P 1711 was inoculated in each flask and cultured at 30°C for 72 hours with shaking.

Microbial growth and L-lysine accumulated were determined and are shown in Table 7.

Table 7

| Phages No./Cells No. | N-stearoyl glutamic acid sodium salt (μg/ml) | Growth (× 1/26) | Lysine accumulated (g/dl) |
|---|---|---|---|
| 0 | 0 | 1.10 | 3.80 |
| | 0.2 | 1.05 | 3.92 |
| | 2 | 1.08 | 3.59 |
| | 20 | 1.09 | 3.62 |
| | 200 | 1.05 | 3.73 |
| $4.8 \times 10^{-3}$ | 0 | 0.21 | 0.18 |
| | 0.2 | 0.32 | 0.56 |
| | 2 | 0.58 | 1.20 |
| | 20 | 1.10 | 3.63 |
| | 200 | 1.08 | 3.70 |

EXAMPLE 7

An aqueous culture medium was prepared to contain, per deciliter, 8 g glucose, 0.02 g $KH_2PO_4$, 1.5 g $NH_4NO_3$, 0.2 g $CaCl_2$, 0.2 mg ferrous ion, 0.2 mg manganese ion, 4 ml/dl soy-protein acid hydrolyzate, and 0.1 g RNA of yeast. 20 Ml batches of the medium were placed in 500 ml flasks, and to each flask was added the amount of N-oleoyl glutamic acid potassium salt shown in Table 8. The flasks were sterilized with steam.

Each flask was inoculated with Bacillus subtilis FERM-P 2107, and was held at 34°C for 72 hours with shaking. A phage of FERM-P 2107 was added after 12 hours cultivation. Growth of FERM-P 2107 and guanosine accumulated in the culture broth were determined and are shown in Table 8.

Table 8

| Phages No./Cells No. | N-oleoyl glutamic acid potassium salt ($\mu$g/ml) | Growth ($\times$ 1/26) | Guanosine accumulated (g/dl) |
| --- | --- | --- | --- |
| 0 | 0 | 0.55 | 0.45 |
|  | 0.2 | 0.58 | 0.42 |
|  | 2 | 0.52 | 0.45 |
|  | 20 | 0.30 | 0.32 |
| $1.1 \times 10^{-5}$ | 0 | 0.18 | 0.20 |
|  | 0.2 | 0.53 | 0.45 |
|  | 2 | 0.56 | 0.42 |
|  | 20 | 0.40 | 0.35 |
| $1.1 \times 10^{-3}$ | 0 | 0.10 | 0.14 |
|  | 0.2 | 0.50 | 0.40 |
|  | 2 | 0.55 | 0.46 |
|  | 20 | 0.41 | 0.30 |

EXAMPLE 8

An aqueous culture medium was prepared to contain, per deciliter, 1 g bouillon, 1 g peptone, 0.5 g soy-protein and 5 g soluble starch, and adjusted at pH 7.0. 50 Ml batches were placed in 500 ml flasks. To each flask was added the amount of N-oleoyl homocysteic acid shown in Table 9. The flasks were sterilized with steam, and inoculated with Bacillus subtilis FERM-P 305. Cultivation was carried out at 31.5°C for 48 hours with shaking. After 6 hours cultivation $10^5$ P.F.U. of phages/ml were added to the medium.

The protease activities shown in Table 9 were found in the culture broth.

Table 9

| Phage | N-oleoyl homocysteic acid sodium salt ($\mu$g/ml) | Protease activity (units/dl) |
| --- | --- | --- |
| Added | 0 | 600 |
|  | 0.1 | 1,340 |
|  | 1 | 2,660 |
|  | 10 | 2,490 |
| Not added | 0 | 2,500 |
|  | 0.1 | 2,640 |
|  | 1 | 2,450 |
|  | 10 | 2,420 |

What is claimed is:

1. A method for limiting damage resulting from the presence of a bacteriophage in a fermentation medium, which comprises effecting the fermentation in a medium containing an amount of at least one N-acylamino derivative of glutamic acid, glutamine, homocysteic acid, metallic salts thereof or mixtures thereof which is effective to inhibit the production of bacteriophage in the fermentation medium, said acyl radical of said N-acylamino group being characterized by containing an alkyl or alkenyl moiety having from about 16 to 18 carbon atoms.

2. A method as in claim 1, wherein the amount of N-acylamino derivative is less than 50 $\mu$g/ml.

3. A method as in claim 1, wherein the fermentation medium contains a glutamic acid producing strain of the genus Brevibacterium.

4. A method as in claim 1, wherein the fermentation medium contains a lysine producing strain of the genus Brevibacterium.

5. A method as in claim 1, wherein the fermentation medium contains a guanosine producing strain of the genus Bacillus.

6. A method as in claim 1, wherein the fermentation medium contains a protease producing strain of the genus Bacillus.

7. A method as in claim 1, wherein the N-acylamino acid is N-stearoylglutamic acid.

8. A method as in claim 1, wherein the N-acylamino acid is N-oleoyl glutamic acid.

* * * * *